US009116597B1

(12) United States Patent
Gulasky

(10) Patent No.: US 9,116,597 B1
(45) Date of Patent: Aug. 25, 2015

(54) INFORMATION MANAGEMENT SOFTWARE

(71) Applicant: CA, Inc., Islandia, NY (US)

(72) Inventor: Gary R. Gulasky, Oakdale, PA (US)

(73) Assignee: CA, INC., Islandia, NY (US)

( * ) Notice: Subject to any disclaimer, the term of this patent is extended or adjusted under 35 U.S.C. 154(b) by 191 days.

(21) Appl. No.: 13/837,758

(22) Filed: Mar. 15, 2013

(51) Int. Cl.
G06F 3/048 (2013.01)
G06F 3/0481 (2013.01)

(52) U.S. Cl.
CPC ..................... *G06F 3/0481* (2013.01)

(58) Field of Classification Search
USPC .......................................... 715/762
See application file for complete search history.

(56) References Cited

U.S. PATENT DOCUMENTS

| 7,020,697 | B1 | 3/2006 | Goodman et al. | |
|---|---|---|---|---|
| 7,251,748 | B2 | 7/2007 | Liberty et al. | |
| 2003/0033330 | A1* | 2/2003 | Black et al. | 707/513 |
| 2005/0138111 | A1 | 6/2005 | Aton et al. | |
| 2007/0220428 | A1* | 9/2007 | Kureshy et al. | 715/708 |
| 2007/0250544 | A1 | 10/2007 | Shibata et al. | |
| 2009/0182915 | A1 | 7/2009 | Farrell et al. | |
| 2009/0276692 | A1 | 11/2009 | Rosner | |
| 2010/0125554 | A1 | 5/2010 | Jennings et al. | |
| 2010/0162227 | A1 | 6/2010 | Davies et al. | |
| 2012/0226677 | A1 | 9/2012 | Bolton et al. | |
| 2012/0254467 | A1* | 10/2012 | Kasper et al. | 709/246 |

OTHER PUBLICATIONS

Related U.S. Appl. No. 13/836,593, entitled "Software Management Software," filed Mar. 15, 2013 by Gary R. Gulasky.
Related U.S. Appl. No. 13/837,241, entitled "Problem Management Software," filed Mar. 15, 2013 by Gary R. Gulasky.
Gulasky, Gary R.; Office Action; U.S. Appl. No. 13/836,593; Jan. 28, 2015; United States Patent and Trademark Office; Alexandria, VA.
Gulasky, Gary R.; Office Action; U.S. Appl. No. 13/837,241; Feb. 23, 2015; United States Patent and Trademark Office; Alexandria, VA.
Thuy Dao; Office Action; U.S. Appl. No. 13/836,593; Jun. 10, 2015; United States Patent and Trademark Office; Alexandria, Virginia.
Ruiz, Angelica; Notice of Allowance; U.S. Appl. No. 13/837,241; Jun. 22, 2015; United States Patent and Trademark Office; Alexandria, Virginia.

* cited by examiner

*Primary Examiner* — Peiyong Weng
(74) *Attorney, Agent, or Firm* — Stevens & Showalter LLP

(57) ABSTRACT

Computer systems are managed by providing systems programmers with visual displays and user interfaces that identify certain issues and allow the system programmer to readily apply fixes, patches, and other updates without tediously sifting through a mountain of information and manually addressing those issues. The systems herein, provide a more streamlined approach for the system programmer by reducing the possibility of overlooking a particular issue that may adversely affect the system.

20 Claims, 15 Drawing Sheets

| SYSTEM VIEW | PRODUCT VIEW | ADMINISTRATION | | | | | | | | |
|---|---|---|---|---|---|---|---|---|---|---|
| SYSTEM | | | | EXECUTION LIBRARIES | | | | | | |
| NAME | RISK LEVEL | HIPERs MISSING | PEs RUNNING | PRPs MISSING | PEA MATCH | LMPs VALID | HEALTH CHKS OK | FIXCAT NEEDED | RS LEVEL RUNNING/AVAIL | |
| PAYROLL | ✓ | ✓ 0 | ✓ 0 | ✓ 0 | ✓ 0 | ✓ 0 | ✓ 0 | ✓ N/A | ✓ CARS | |
| DEV SYSTEM ACF ENDEVOR SYSVIEW TLMS VTAPE XCOM | ✗ 4 0 0 0 2 1 | ✗ 3 RO RO RO | ✗ 3 RO RO CBXG | ✓ 0 | ✗ 1 PRB# | ✓ 0 | ✓ 0 | ✗ 2 ZEC ZEC | ✗ CARS INSTALL CARS INSTALL TLMS | |
| QA SYSTEM | ⚠ | ✓ 0 | ✓ 0 | ✓ 0 | ✓ 0 | ✓ 0 | ✓ 0 | ✓ N/A | ✓ CARS | |
| NY LAB | ? | ⓘ 0 | ⓘ 0 | ⓘ 0 | ⓘ 0 | ⓘ 0 | ⓘ 0 | ⓘ 0 | ⓘ CARS | |

FIG. 4A

| SYSTEM VIEW | PRODUCT VIEW | ADMINISTRATION | | | PROBLEM MANAGEMENT ASSISTANT ▽ | | | |
|---|---|---|---|---|---|---|---|---|
| | | SEVERITY 1 | | | | SEVERITY 2 | | |
| SYSTEM NAME | PROB COUNT | ISSUE | STATUS | NEXT ACTION | TARGET | ISSUE | STATUS | NEXT ACTION | TARGET |
| PAYROLL | ✓ | NONE | | | | NONE | | | |
| DEV SYSTEM | ✗ | 4 | | | | | | | |
| ACF | | NONE | | | | NONE | | | |
| ENDEVOR | | NONE | | | | 2117 | OPEN APAR | DEBUG TEST | DATE DATE |
| SYSVIEW | | NONE | | | | 2117 | | | |
| TLMS | | NONE | | | | NONE | | | |
| VTAPE | | NONE | | | | NONE | | | |
| XCOM | | CBXG | CODING | PUBLISH | DATE | NONE | CODING | PUBLISH | DATE |
| QA SYSTEM | ✓ | NONE | | | | NONE | | | |
| NY LAB | ? | NONE | | | | | | | |

820a ← SEVERITY 1
820B ← SEVERITY 2
450
460
810
800

FIG. 8

| SYSTEM VIEW | PRODUCT VIEW | ADMINISTRATION | UPLOAD IMA | | | | | INFORMATION MANAGEMENT ASSISTANT ▽ |
|---|---|---|---|---|---|---|---|---|

SYSTEM

ALERTS AND ACTIONS

| NAME | INFO LEVEL | HIPERs MISSING | PEs RUNNING | PRPs MISSING | PEA MATCH | LMPs VALID | HEALTH CHKS OK | SERVICE HISTORY |
|---|---|---|---|---|---|---|---|---|
| PAYROLL | ✓ | 0 | 0 | 0 | 0 | 0 | 0 | DAY/DATE |
| DEV SYSTEM | ✓ | ✓ 3 | 3 | 0 | 1 | 0 | 0 | DAY/DATE |
| ACF | 4 | UNREAD 1 | UNREAD 1 | 0 | UNREAD 1 | 0 | 0 | CARS |
| ENDEVOR | 0 | 0 | 0 | 0 | 0 | 0 | 0 | |
| SYSVIEW | 0 | 0 | 0 | 0 | 0 | 0 | 0 | |
| TLMS | 0 | UNREAD 1 | READ 1 | 0 | 0 | 0 | 0 | NEW RELEASE |
| VTAPE | 2 | UNREAD 0 | UNREAD 0 | 0 | 0 | 0 | 0 | |
| XCOM | 2 | | | | | | | |
| QA SYSTEM | ✓ | 0 | 0 | 0 | 0 | 0 | 0 | DAY/DATE |
| NY LAB | | UNKNOWN | UNKNOWN | UNKNOWN | UNKNOWN | UNKNOWN | UNKNOWN | DAY/DATE |

FIG. 12A

| SYSTEM VIEW | PRODUCT VIEW | ADMINISTRATION | UPLOAD IMA | | | INFORMATION MANAGEMENT ASSISTANT ▽ | | |
|---|---|---|---|---|---|---|---|---|
| | AWARENESS / TIME SENSITIVE | | | | | REFERENCE MATERIAL | | |
| NAME | SHARE/ LINUX | MMM | USER GROUPS | RSS DATA FEEDS | SOCIAL MEDIA | BOOK SHELVES | PDCs | KNOWLEDGE DOCUMENTS |
| PAYROLL | 0 | 0 | 2 | 0 | 0 | LIBRARY | 0 | YOUTUBE |
| DEV SYSTEM | | | | | | | | |
| ACF | 4 | 4 | 1 | 0 | 8 | LIBRARY | 0 | VARIOUS ITEMS |
| ENDEVOR | 0 | 0 | 0 | MAIN 2 | 0 | SHELF | 2 | US REGS |
| SYSVIEW | 0 | 0 | SHARE 1 | 0 | SCM 2 | SHELF | 0 | HOW TOs |
| TLMS | READ 3 | HOW TO 4 | 0 | 0 | 0 | SHELF | 0 | PPT PREZ |
| VTAPE | 0 | 0 | 0 | 0 | SUG 6 | SHELF | 0 | PIBs |
| XCOM | UNREAD 1 | 0 | 0 | MF 1 | 0 | SHELF | 1 | |
| QA SYSTEM | 1 | 0 | 0 | 0 | 0 | LIBRARY | 0 | NEWS FLASH |
| NY LAB | 0 | 2 | 1 | 0 | 1 | LIBRARY | 0 | |

FIG. 12B

INFORMATION MANAGEMENT SOFTWARE

BACKGROUND

The present disclosure relates generally to computers and, more particularly, to systems and methods for managing computer systems.

Various software components control the operations of computer systems. For example, operating systems (OS) manage computer hardware resources and provide common services for various computer programs or modules that are installed on a particular computer system. To the extent that computer systems are connected to a network, it is now possible to provide software (e.g., OS, programs, modules, etc.) and other services over the network, with ongoing efforts to improve over-the-network delivery of software and services.

SUMMARY

According to various aspects of the present disclosure, a machine-executable process in a mainframe system is provided. The process comprises (optionally repeatedly) searching a support database for new support related information. The process also comprises determining a location of the new support related information and generating a user-selectable Universal Resource Locator (URL) of the determined location. The process still further comprises inserting the generated URL into a user interface.

According to still further aspects of the present disclosure, a mainframe system is provided. The mainframe system comprises a support database and an information management assistant communicatively coupled to the support database, the information management assistant operative to (optionally repeatedly) search the support database for new support information, the information management assistant operative to further generate a URL associated with the new support information, the information management assistant to further display the generated URL in near-real time.

According to still further aspects of the present disclosure, a computing device is configured to execute computer code to generate a graphical user interface. The graphical user interface comprises a first segment comprising a first ordered listing of entries, the first ordered listing of entries comprising a first user-selectable entry, the first user-selectable entry comprising a first hyperlink to information associated with a first condition, the first condition having a first risk level. The graphical user interface also comprising a second segment that is visually separate from the first segment, the second segment comprising a second ordered listing of entries, the second ordered listing of entries comprising a second user-selectable entry, the second user-selectable entry comprising a second hyperlink to information associated with a second condition, the second condition having a second risk level, the second risk level being less than the first risk level.

BRIEF DESCRIPTION OF THE DRAWINGS

FIGS. 4A and 4B are diagrams showing an embodiment of a graphical user interface (GUI) associated with the SMA of FIGS. 1 through 3.

FIG. 8 is a diagram showing an embodiment of a GUI associated with the PMA of FIGS. 5 through 7.

FIGS. 12A and 12B are diagrams showing one embodiment of a GUI associated with the IMA of FIGS. 9 through 11.

DETAILED DESCRIPTION

Figure 1:
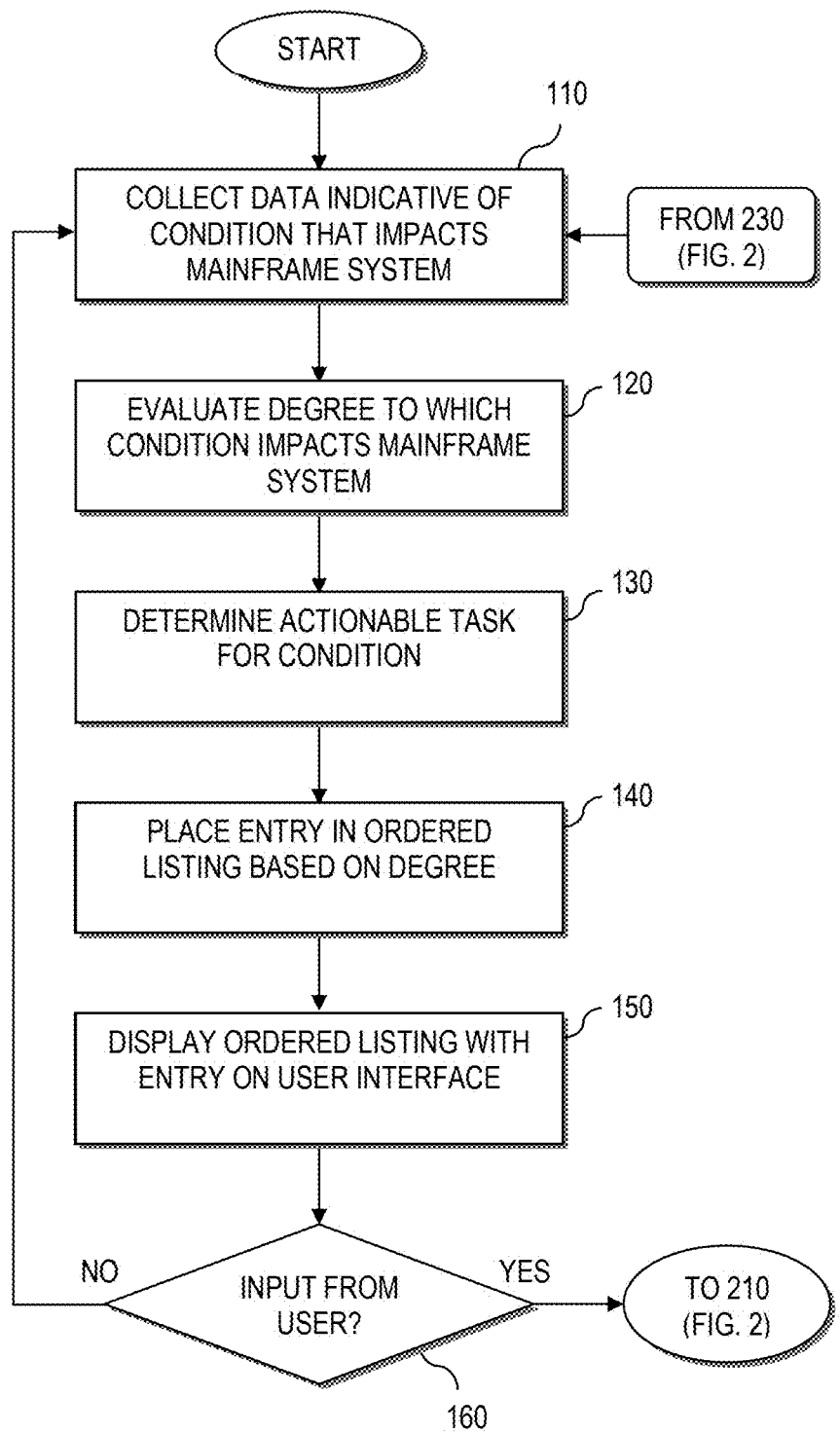
FIG. 1 is a flowchart showing an embodiment of a process for managing software in a mainframe system.

According to various aspects of the present disclosure, some embodiments comprise the steps of repeatedly searching a support database for new support related information, determining a location of the new support related information, generating a user-selectable Universal Resource Locator (URL) of the determined location, and inserting the generated URL into a user interface.

Hardware resources for many (if not all) computer systems are controlled by software, such as operating systems (OS), which provide common services for other installed computer programs or modules. Often, software and other services are provided through a network, such as the Internet. While over-the-network services have become somewhat ubiquitous, there are certain contexts in which those services may become unmanageable.

In mainframe systems (e.g., z/OS environment, etc.) that are capable of supporting multiple services and devices, it is possible that the sheer quantity of updates and alerts can overwhelm the systems programmers (SYSPROGs) that are tasked with managing those mainframe systems. For example, mainframe systems may receive thousands of updates, patches, fixes, or other notices every year. The volume of information that competes for the system programmer's attention is oftentimes unwieldy and can result in the system programmer overlooking a critical system-related issue.

Compounding to the volume are the qualitative factors, such as the degree to which a particular alert or update can affect a particular mainframe system (e.g., critical system-related alerts, software patches, information updates, etc.). Given these complexities, sometimes it becomes tedious and cumbersome to properly apply all of the updates, patches, and other fixes that are recommended or required for optimal system performance.

It is to this and corresponding shortcomings that the disclosed embodiments are directed. Namely, the disclosed embodiments provide systems and methods for managing computer systems by providing a system programmer with a visual display and a user interface that identifies certain issues and allows the system programmer to readily apply fixes, patches, and other updates without tediously sifting through a mountain of information and manually addressing those issues. This provides a more streamlined approach for the system programmer and reduces the possibility of overlooking a particular issue that may adversely affect the system.

Specifically, some embodiments include a management application referred to herein as a Software Management Assistant (SMA), which collects all relevant software-related issues in a mainframe system and displays them at a user interface in easily-discernible categories, preferably in near-real time. Thus, the SMA provides a system programmer with a way to address software-related issues as they arise. Other embodiments include a management application referred to herein as a Problem Management Assistant (PMA), which identifies problems or errors in a mainframe system and displays those errors to the system programmer in near-real time. Similar to the SMA, the PMA provides an easy-to-use interface for the system programmer to view and address problems in a mainframe system in near-real time. Still other embodiments include a management application referred to herein as an Information Management Assistant (IMA), which aggregates and displays information relating to a mainframe system in near-real time. Although each of these embodiments (e.g., SMA, PMA, and IMA) is individually discussed in greater detail below, it should be appreciated that, in yet other embodiments, the SMA, PMA and IMA can be used in various combinations to provide a more robust service to the system programmer. With this in mind, attention is turned to FIGS. 1 through 13, which describe example embodiments of the SMA, PMA, IMA, and example combinations of these components in greater detail.

Software Management Assistant (SMA)

As noted above, given the volume (and sometimes complexity) of software issues that are unique to mainframe systems, a system programmer may become overwhelmed when attempting to address every software-related issue. Currently, there exists no streamlined approach that assists the system programmer with such tedious (yet important) day-to-day tasks. To relieve the system programmer of some of the routine tasks, some of the disclosed embodiments are directed to a Software Management Assistant (SMA), as shown with reference to FIGS. 1 through 4. The SMA collects all relevant software-related issues in a mainframe system and displays them at a user interface in easily-discernible categories, preferably in near-real time, thereby providing the system programmer with a way to address software-related issues as they arise. This, in turn, results in fewer (if any) overlooked tasks and easier management of software.

With this general overview of the SMA in mind, attention is turned to FIG. 1, which is a flowchart showing one embodiment of a process for managing software in a mainframe system. As shown in FIG. 1, this embodiment of the process begins by collecting 110 data that is indicative of a condition that impacts a mainframe system. By way of example, the condition may range from a High-Impact PERvasive (HIPER) condition to an uninstalled update for licensed software.

Continuing with FIG. 1, upon collecting 110 the data, the process evaluates 120 a degree to which the condition impacts the mainframe system. Using the previous example, the degree to which a HIPER condition impacts the mainframe system would be high, since a HIPER condition can result in catastrophic effects on the mainframe system. Conversely, the degree to which an expired licensing key impacts the mainframe system may be comparatively minimal. For some embodiments, the evaluation 120 may entail applying a predefined set of rules for various conditions. For other embodiments, the evaluation 120 may entail parsing data that is associated with the condition to determine if the data itself has an indicator of a risk level. Regardless, the evaluation 120 process can provide information on new product releases to be applied, service items to be executed, software items to be removed, software licensing keys to be updated, operating status updates, etc.

The process next determines 130 an actionable task that is associated with the condition. For example, a HIPER condition may require downloading and installation of a Program Temporary Fix (PTF) as its actionable task. As yet another illustrative example, an expired licensing key may simply require an update of the license as its actionable task. Indeed, a corresponding actionable task is assignable for a plethora of conditions that can arise in the mainframe system (e.g., HIPER, PTF, PTF-in-Error (PE), PTF Resolving PE PTF (PRP), Product Error Alerts (PEA), Product Document Changes (PDC), Fix Categories (FIXCAT), License Managed Program (LMP) key expiration, etc.).

The process next places 140 an entry in an ordered listing, where the entry represents the condition. Additionally, the entry is placed 130 in the ordered listing based on the degree to which the condition impacts the mainframe system. Thus, for example, an entry that represents a HIPER condition would be placed before an entry that represents a PDC in the ordered listing. The entry, for some embodiments, also represents the degree to which the condition impacts the mainframe system as well as the actionable task that is associated with the condition.

The ordered listing is then displayed 150 on a user interface, preferably a graphical user interface (GUI), through which a user (e.g., system programmer) may provide input. If the user provides no input, then the process continues to collect 110 data, evaluate 120 conditions, determine 130 actionable tasks, place 140 entries in the ordered listing, and continually update the user interface. One embodiment of the GUI is described in greater detail with reference to FIGS. 4A and 4B.

Figure 2:
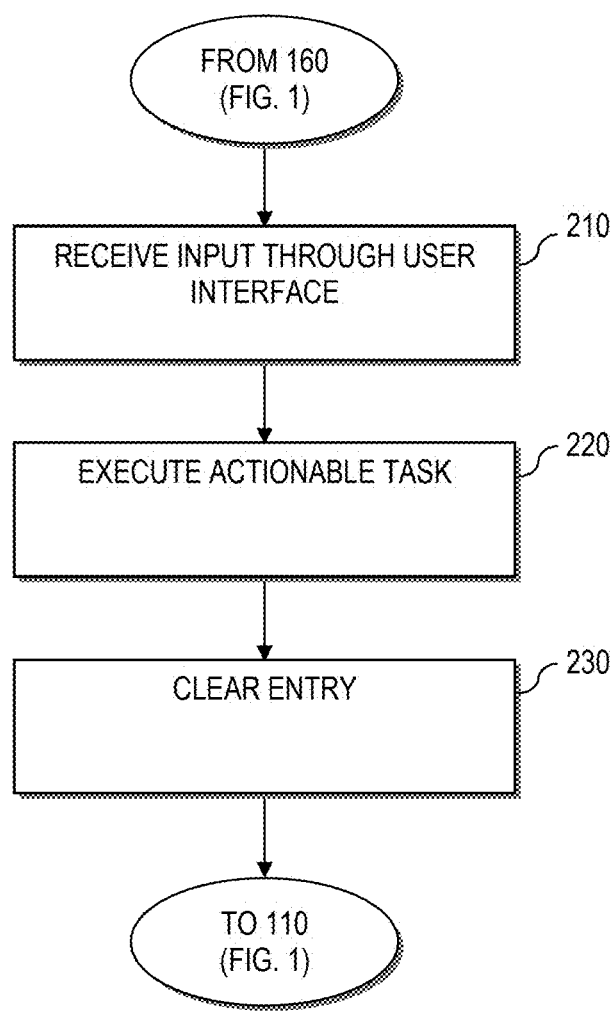
FIG. 2 is a flowchart showing another embodiment of a process for managing software in a mainframe system.

However, if a user provides an input, then the process continues to FIG. 2. As shown in the flowchart of FIG. 2, the process receives 210 the user input through the user interface. In response to the user input, the process executes 220 the actionable task. Once the actionable task is executed 220, the process may clear 230 the entry. By way of example, the entry can be cleared 230 by deleting the entry from the system, removing the entry from the user interface, marking the entry as being completed, moving the entry to a different location on the user interface, or changing the appearance of the entry. The ordered listing is automatically updated when the entry is cleared 230. In other embodiments, the entry is cleared by another management application, e.g., the IMA. The processes of FIGS. 1 and 2 provide for near-real time updates of software conditions and allow a user to address those conditions on-the-fly.

Figure 3:
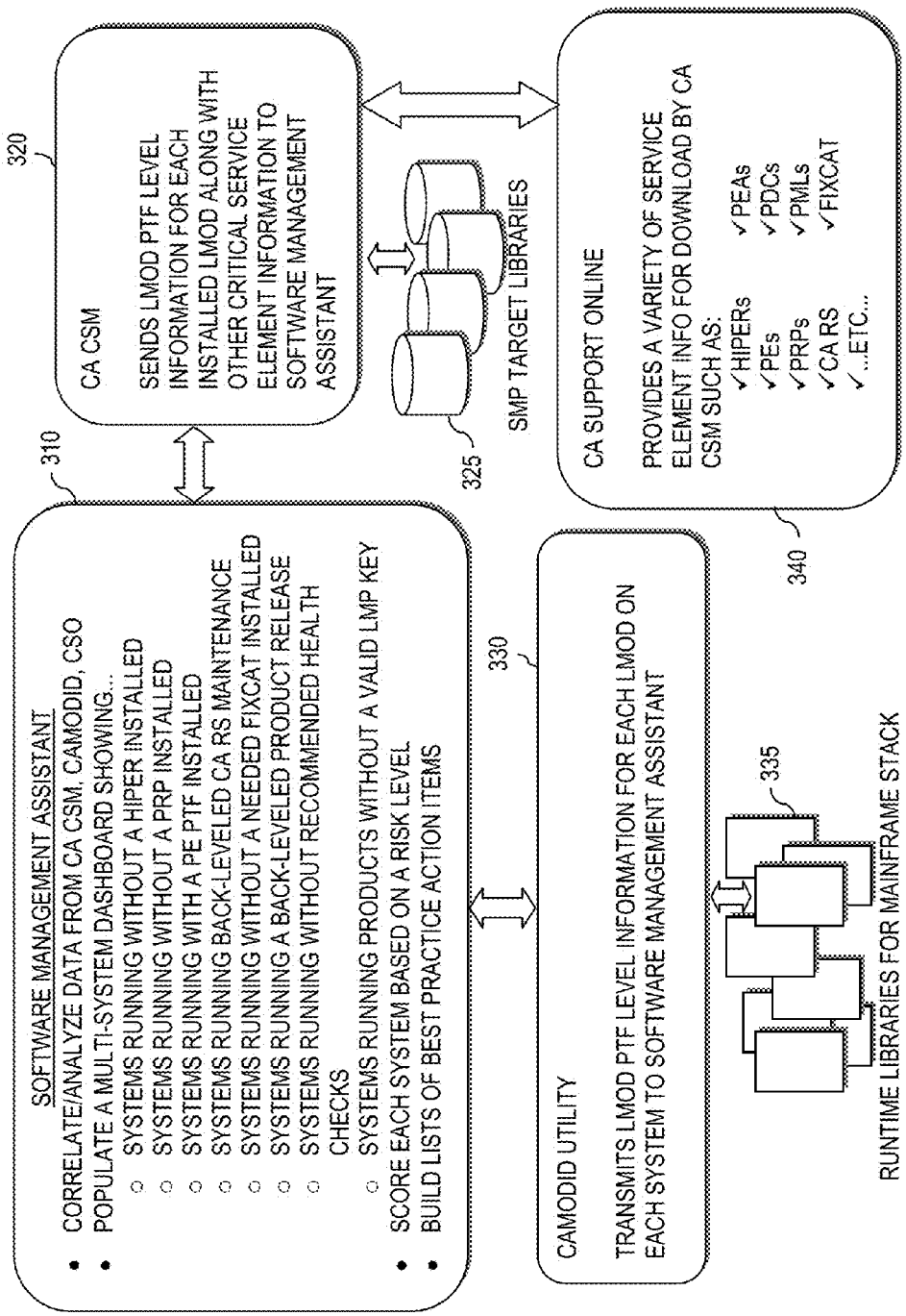
FIG. 3 is a diagram showing various system components that are associated with an embodiment of management software referred to herein as a Software Management Assistant (SMA).

Having described several embodiments of processes for managing software, attention is turned to FIG. 3, which shows an embodiment of various system components that are associated with the SMA. Specifically, FIG. 3 shows a mainframe system z/OS environment that is supported by components from CA Technologies®. While specific CA Technologies® components are shown in FIG. 3, it should be appreciated that this particular environment is only used to more-clearly illustrate the various embodiments disclosed herein, and one having skill in the art will appreciate that the processes, systems, and interfaces described herein are applicable to other mainframe environments.

With this in mind, the embodiment of FIG. 3 comprises the SMA 310, which collects the data from various sources, such as, for example, a mainframe software manager 320 (e.g., CA Chorus™ Software Manager (CSM)) with System Modification Program/Extended (SMP/E from IBM®) target libraries 325, an online support database 340 (e.g., CA Support Online (CSO)), and a software module utility 330 (e.g., CAMODID Utility) with runtime libraries 335. The collected data is populated into a GUI, such as a dashboard, which shows various mainframe system conditions, such as, for example, HIPER, PTF, PE, PRP, PEA, PDC, FIXCAT, LMP expiration, etc.

Since the CA CSM 320, the CAMODID 330, and the CA CSO 340 are known in the art, only a truncated discussion of these components is provided to more-clearly illustrate the understanding of the SMA 310. Specifically, the CA CSM 320 provides a standardized set of software management services that permit a system programmer to acquire, install, deploy, configure, and maintain mainframe software. As such, the CA CSM 320 includes Load MODules (LMOD), other service elements, and their corresponding information. This information is collected by the SMA 310, either by querying the CA CSM 320 for software updates or installs (pulling the data), or alternatively by having the CA CSM 320 push the data to the SMA 310.

The CAMODID 330 manages the runtime libraries 335 for mainframe stack products. As such, the CAMODID 330 includes information on LMOD PTF levels for each LMOD on each mainframe system. The SMA 310 also collects this information from the CAMODID 330 by either pulling the information or having the CAMODID push that information to the SMA 310.

The CSO 340 provides technical and customer support online for technical product resources, implementation and upgrade of products, notifications and updates on software, product documentation, and a host of other online support features. As such, the CSO 340 includes service elements such as HIPER, PEA, PE, PRP, PDC, FIXCAT, etc. These service elements are collected by the SMA 310 in a similar manner to how the SMA 310 collected data from the CAMODID 330 and the CA CSM 320.

Once the SMA 310 collects the data from the CA CSM 320, CAMODID 330, and the CSO 340, the SMA 310 generates an ordered listing of system conditions, such as those shown in FIG. 3. The SMA 310 also provides actionable tasks to the user based on how a particular item will impact the z/OS mainframe system. For example, the ordered listing may include systems running: without a HIPER installed; without a PRP installed; with a PE PTF installed; without a FIXCAT installed; without a recommended health check; products without a valid LMP key, etc. The ordered listing is displayed on a user interface, and is updated in near-real time as new updates or fixes are collected from the CA CSM 320, CAMODID 330, or CSO 340.

Figure 4B:
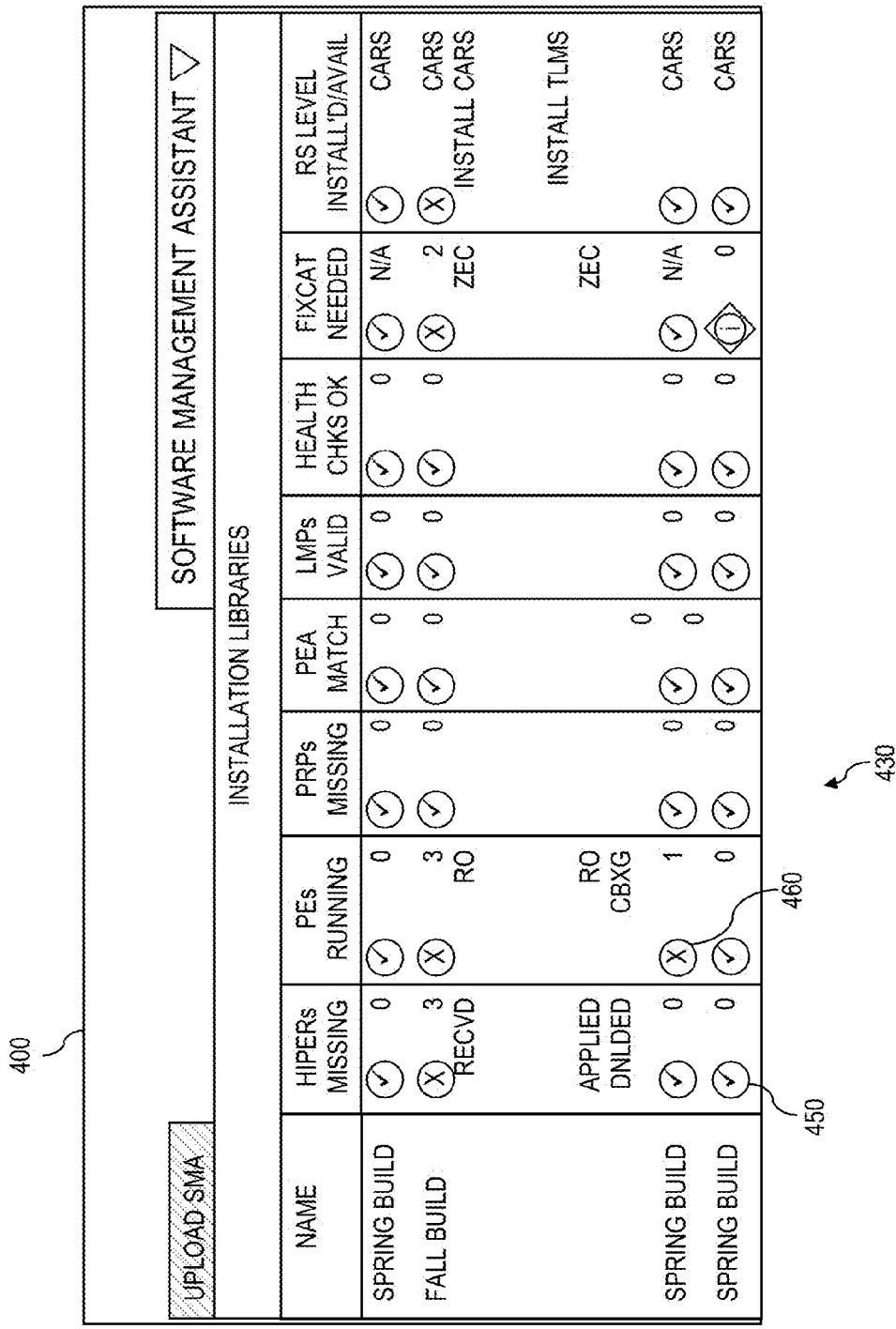

Referring to FIGS. 4A and 4B, an example embodiment of the user interface is a GUI 400 that has multiple user-selectable icons. For clarity, the GUI 400 of FIGS. 4A and 4B is specific to a z/OS environment that is operating with CA Technologies® products and services, such as that shown in FIG. 3. However, similar principles apply to other mainframe system environments, and that the GUI 400 is not intended to be limited to only CA Technologies® products and services.

With this in mind, the GUI 400 comprises an ordered listing 410 of conditions associated with different systems, such as, for example, a payroll system, a quality assurance system, development systems, etc. Furthermore, for purposes of illustration, the GUI 400 is separated into execution libraries 420 and installation libraries 430. These libraries 420, 430 comprise notifications that alert a system programmer of mainframe system conditions, such as, for example, missing HIPER, running PE, missing PRP, PEA mismatches, invalid LMP, health check statuses, needed FIXCAT, etc. As shown in FIGS. 4A and 4B, the HIPER is located first, since a HIPER condition can catastrophically affect a mainframe system, and the LMP alert is located later (e.g., to the right of the HIPER), since an invalid LMP does not have the same impact on the mainframe system as a missing HIPER.

The GUI 400 also comprises multiple icons 440, 450, 460, which are indicative of different mainframe system conditions for each alert or notification. For example, a checkmark icon 450 may indicate that the mainframe system is operating without any issues, while an X-mark icon 460 may be indicative of a critical system-related condition that needs to be addressed by the system programmer, while a warning icon 440 may indicate a less-critical system-related condition. As such, the type of icon is indicative of a risk level associated with the mainframe system. For some preferred embodiments, the icons 450, 460 comprise hyperlinks or some other type of embedded Universal Resource Locator (URL) to software programs, such as PTF, which can be executed to remedy the condition.

The example data in the dashboard illustrated in FIGS. 4A and 4B illustrate, for example, that the payroll system is running without any issues and, hence, the system programmer does not have any actionable task associated with the payroll system. Conversely, the installation library 430 shows that the development system has, for example, three (3) missing HIPER, two (2) needed FIXCAT, etc., all of which needs the attention of the system programmer. Since the X-mark icons 460 comprise hyperlinks to PTF or other programs that can remedy these conditions, the system programmer can execute the necessary actionable tasks by selecting the corresponding X-mark icon 460. Upon selecting the X-mark icon 460 and triggering the program associated with the URL, the SMA 310 (FIG. 3) clears the condition.

Using another example, the quality assurance (QA) system shows a less-critical system-related alert 440, which can arise from a discrepancy between the execution library 420 and the installation library 430. As shown in FIGS. 4A and 4B, the execution library shows that there are no conditions that require the attention of the system programmer (i.e., all icons in the execution library 420 are checkmark icons 450). However, the installation library 430 shows one icon 460 showing a PE running from a prior build. This discrepancy between the installation library 430 and the execution library 420 results in a warning icon (exclamation-mark) 440, which alerts the system programmer of the discrepancy.

By providing such a user-friendly GUI 400, the SMA 310 (FIG. 3) permits a system programmer to efficiently correct various conditions that impact a mainframe system to different degrees. Thus, unlike prior practice, where the system programmer drudged through the menial task of manually identifying the condition, searching for corresponding actionable tasks to remedy the condition, and then executing actionable tasks, the embodiments of FIGS. 1 through 4B provide processes, systems, and user interfaces that streamline mainframe system updates and maintenance.

Problem Management Assistant (PMA)

Referring generally to FIGS. 5 through 8, several embodiments illustrate of processes, systems, and user interfaces for a Problem Management Assistant (PMA). As described in greater detail herein, the PMA identifies problems or errors in a mainframe system and displays those errors to the system programmer in near-real time. Analogous to the SMA 310, the PMA provides an easy-to-use interface for the system programmer to view and address problems in a mainframe system in near-real time. Unlike the SMA 310, the PMA is directed to identifying errors (or failures or problems), gathering documentation for the errors, and searching for possible solutions. To place some context on the function of the PMA, mainframe systems can experience thousands of system errors annually. Consequently, manually addressing these errors can become a time-consuming task for a system programmer, and the PMA is directed to relieving some of this burden.

Figure 5:
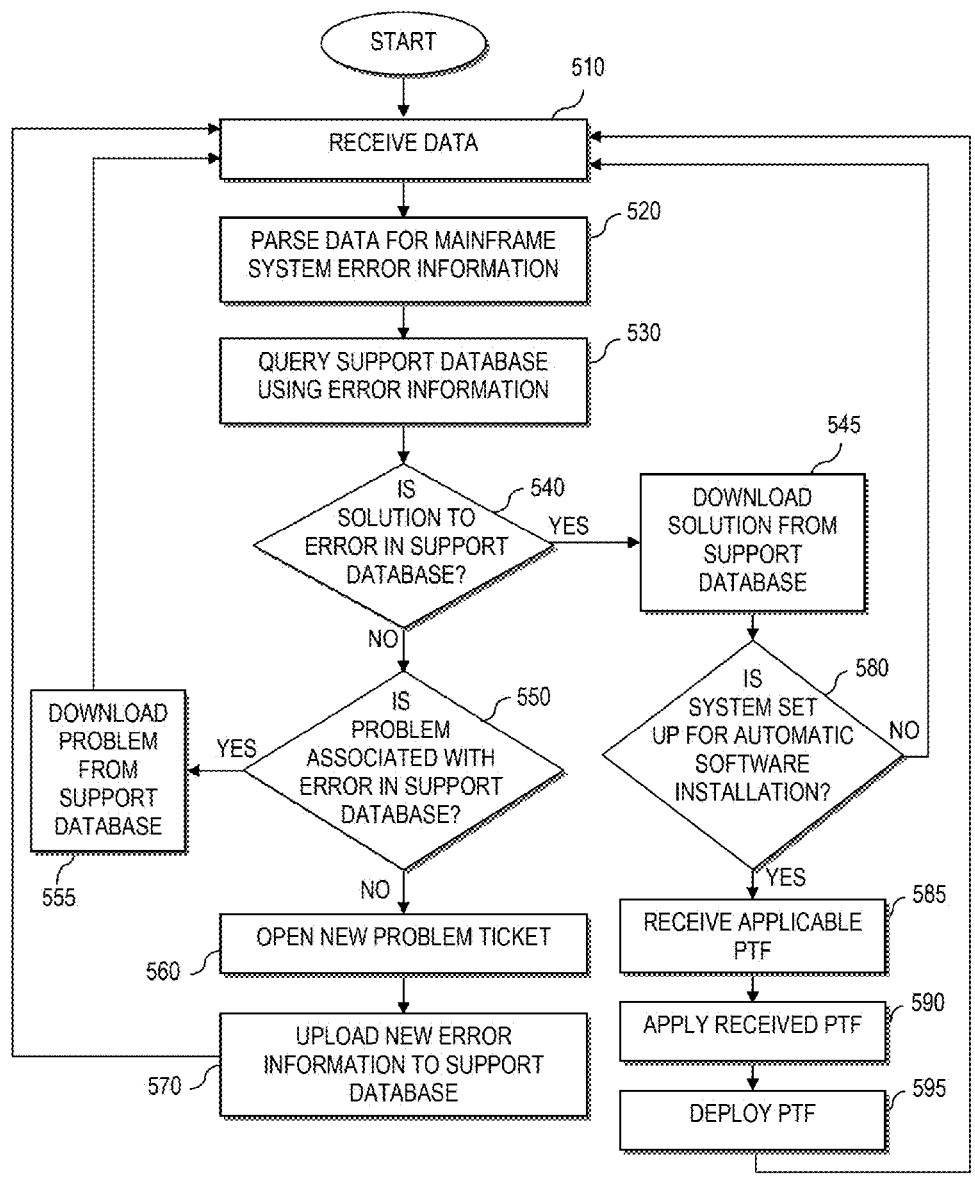
FIG. 5 is a flowchart showing an embodiment of a process for managing system problems in a mainframe system.

Referring specifically to FIG. 5, a flowchart illustrates an embodiment of a process for managing system problems in a mainframe system. The illustrative process begins by receiving 510 data. To the extent that the process operates within a mainframe system environment (e.g., z/OS environment), the data can be received from error-reporting programs, such as, for example, Environmental Record and Editing Printing (EREP) program by IBM®, or mainframe environment management programs, such as, for example, CA-SYSVIEW® program by CA Technologies®. Similar to the SMA 310 (FIG. 3), the data can be pulled by the PMA or pushed to the PMA by the error-reporting programs.

Upon receiving 510 the data, the process parses 520 the data for mainframe system error information. The error information is used to query 530 a support database, such as, for example, CSO 340 (FIG. 3). Since support databases, such as the CSO 340 (FIG. 3) are discussed with reference to FIG. 3, only a truncated discussion is provided here with reference to FIG. 5.

Once the support database is queried 530, the process determines 540 whether a solution exists in the support database. If a solution exists in the support database, then the process downloads 545 the solution from the support database. If a particular system is not set up for automatic software installation, then the process repeats by receiving 510 additional data. If the system is set up for automatic software installation, then the process receives 585 an applicable PTF (or other software fix), applies 590 the received PTF, and deploys 595 the PTF. Thereafter, the process repeats by receiving 510 additional data.

Continuing, if the solution does not exist in the support database, then the process determines 550 whether the error or problem exists in the support database. If the error exists in the support database, then the process downloads 555 the problem from the support database. If neither the solution nor the problem exists in the support database, then the process opens 560 a new problem ticket, and uploads 570 the error information (or problem information) to the support database. Thereafter, the process of FIG. 5 repeats. As shown from the embodiment of FIG. 5, the process automatically initiates a resolution process, rather than requiring a system programmer to manually research and apply a solution.

Figure 6:
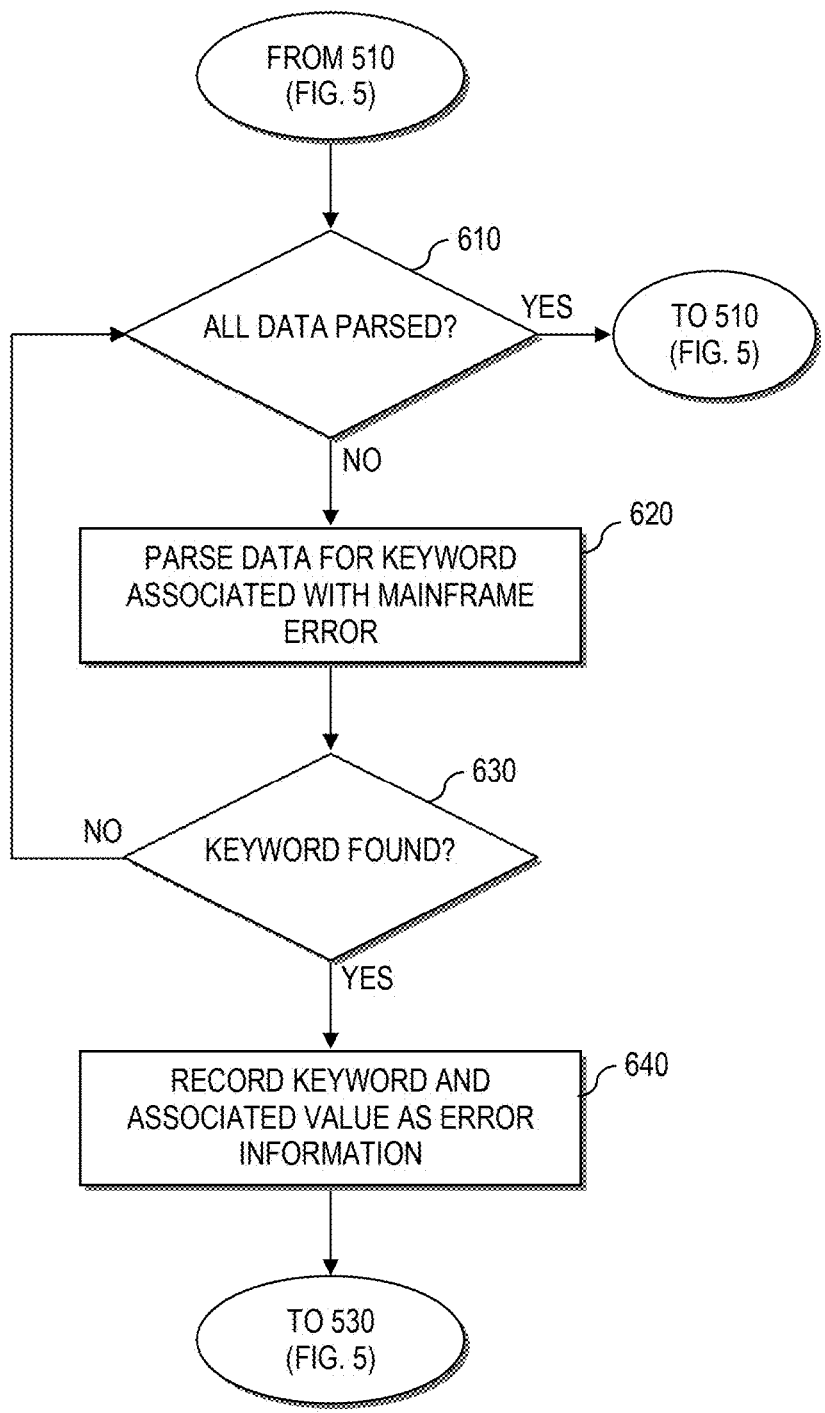
FIG. 6 is a flowchart showing another embodiment of a process for managing system problems in a mainframe system.

Referring to FIG. 6, a flowchart illustrates an example approach to implementing the process of parsing data (520 in FIG. 5). As illustrated, the parsing process begins by determining 610 whether or not all of the available data has been parsed. If all of the available data has been parsed, then the process exits to the beginning of FIG. 5. Conversely, if all of the data has not yet been parsed, then the process parses 620 the data for a keyword associated with a mainframe error, and determines 630 if the keyword is found in the data. If the keyword is not found in the data, then the process returns to determine 610 if all of the data has been parsed. If, however, the keyword is found, then the process records 640 the keyword and any associated value as error information.

To more-clearly illustrate the embodiment of FIG. 6, some examples of known keywords and values in SYSVIEW® or EREP programs are:

| EXAMPLE KEYWORD | EXAMPLE VALUE |
| --- | --- |
| JOBNAME | DATACOM |
| ABEND | 0C4 |
| OFFSET | 1C8 |
| PROGRAM NAME | DBLOAD12 |

Thus, for these keywords and values, the process would build a search argument, such as, for example, "JOBNAME=DATACOM, ABEND=0C4, OFFSET=1C8, PROGRAM NAME=DBLOAD12." This search argument would be used to query 530 (FIG. 5) the CSO 340 for possible solutions or problems.

Depending on the desired granularity, the process may be implemented to take different actions based on whether there is an exact match, close match, poor match, or no match. And, the degree to which the search query matches an entry in the support database can be based on a predefined set of rules, or other programmable metric.

Figure 7:
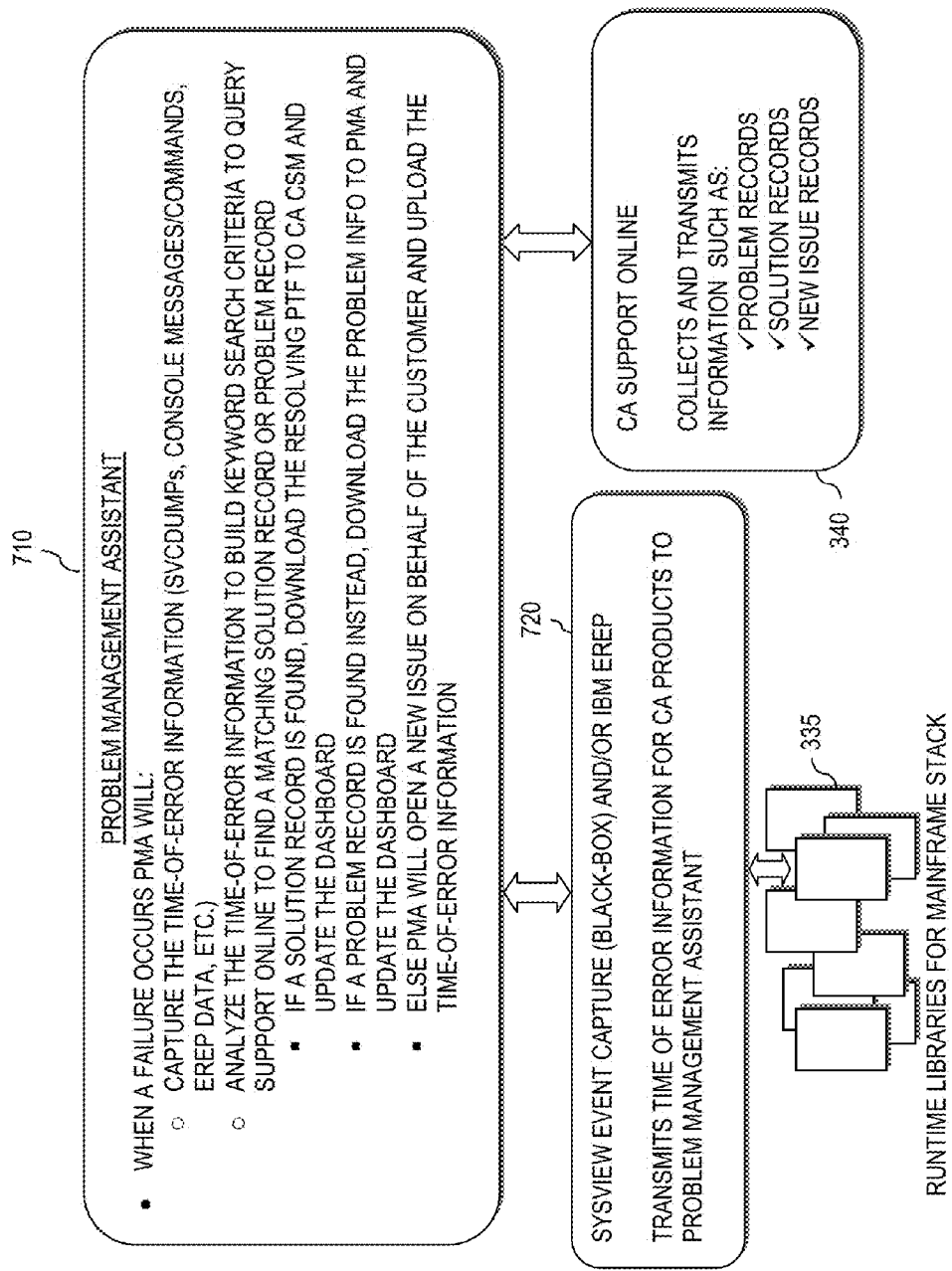
FIG. 7 is a diagram showing various system components that are associated with an embodiment of management software referred to herein as a Problem Management Assistant (PMA).

Referring to FIG. 7, which shows an embodiment of various system components that are associated with a Problem Management Assistant (PMA) 710. Similar to the description of the SMA 310 (FIG. 3), for purposes of clarity, the PMA 710 is described in detail with reference to a z/OS environment having CA Technologies® services and products installed. Thus, the embodiment of FIG. 7 comprises a PMA 710, a CSO 340, and an error-reporting program 720, such as EREP or SYSVIEW® program.

When a failure or error occurs in the z/OS mainframe system, the PMA 710 receives the error information from the SYSVIEW® or EREP program 720. Again, the error information can be pulled from the SYSVIEW® or EREP program 720, or alternatively the SYSVIEW® or EREP program 720 can push the error information to the PMA 710. Once the error information is received, the PMA 710 analyzes the error information to build a keyword search criteria.

That keyword search criteria is used to query CSO 340 to find a matching solution record or a matching problem record, as shown in the process of FIG. 6. If a solution record is found, then its corresponding solution (e.g., resolving PTF) is downloaded to the CA CSM® 320 (FIG. 3) and a hyperlink to the downloaded PTF is displayed on a GUI, such as that shown in FIG. 8. If no solution is found, but the same (or similar) problem is found, then the PMA 710 downloads the problem information and a hyperlink to the downloaded problem information is displayed on the GUI. Otherwise (when neither the solution nor the problem are found in the CSO 340), the PMA 710 opens a new issue, uploads the new issue to the CSO 340, and updates the GUI to reflect the new issue.

One embodiment of the PMA GUI 800 is shown with reference to FIG. 8. As shown in FIG. 8, the GUI 800 comprises an ordered listing 810, similar to that shown in FIGS. 4A and 4B with reference to the SMA 310. Additionally, the GUI 800 comprises risk level segments 820a, 820b (collectively 820) that are arranged in order of severity or risk level. Thus, for example, severity-1 would indicate issues that can have a high impact on the mainframe system, severity-2 would indicate issues that have a lesser impact on the mainframe system, etc. Each risk level segment further comprises an ordered listing of the error, if any, its corresponding status, a recommended (or required) actionable task to remedy the error, a target, etc.

The specific example of FIG. 8 shows that there are no errors or issues with a payroll system, but there are four (4) problem counts that are associated with some development system components. As such, there is an X-mark icon 460 in the development system segment to indicate the errors, while a checkmark icon 450 exists in the payroll system segment to indicate that payroll system is error-free. When the system programmer selects the X-mark icon 460, the PMA 710 (FIG. 7) searches for the solution in the CSO 340 and takes appropriate action, as described with reference to FIGS. 5 and 6.

Similar to the SMA 310 (FIG. 3), by providing such a user-friendly GUI 800, the PMA 710 (FIG. 3) permits a system programmer to efficiently handle errors and fixes, which were previously applied through manual identification and resolution. Thus, the embodiments of FIGS. 5 through 8 provide processes, systems, and user interfaces that alleviate the work of the system programmer in maintaining a mainframe system that is largely error-free.

Information Management Assistant (IMA)

In addition to the SMA 310 (FIG. 3) and the PMA 710 (FIG. 7), another embodiment includes an Information Management Assistant (IMA), which aggregates and displays information relating to a mainframe system in near-real time. Given the sheer volume of software updates and errors (sometimes in excess of tens of thousands of total items annually for mainframe systems), the amount of information and documentation generated from these errors, updates, fixes, etc. can be overwhelming to a system programmer. The IMA is directed to providing the system programmer with a convenient interface to manage all of this information.

Figure 9:
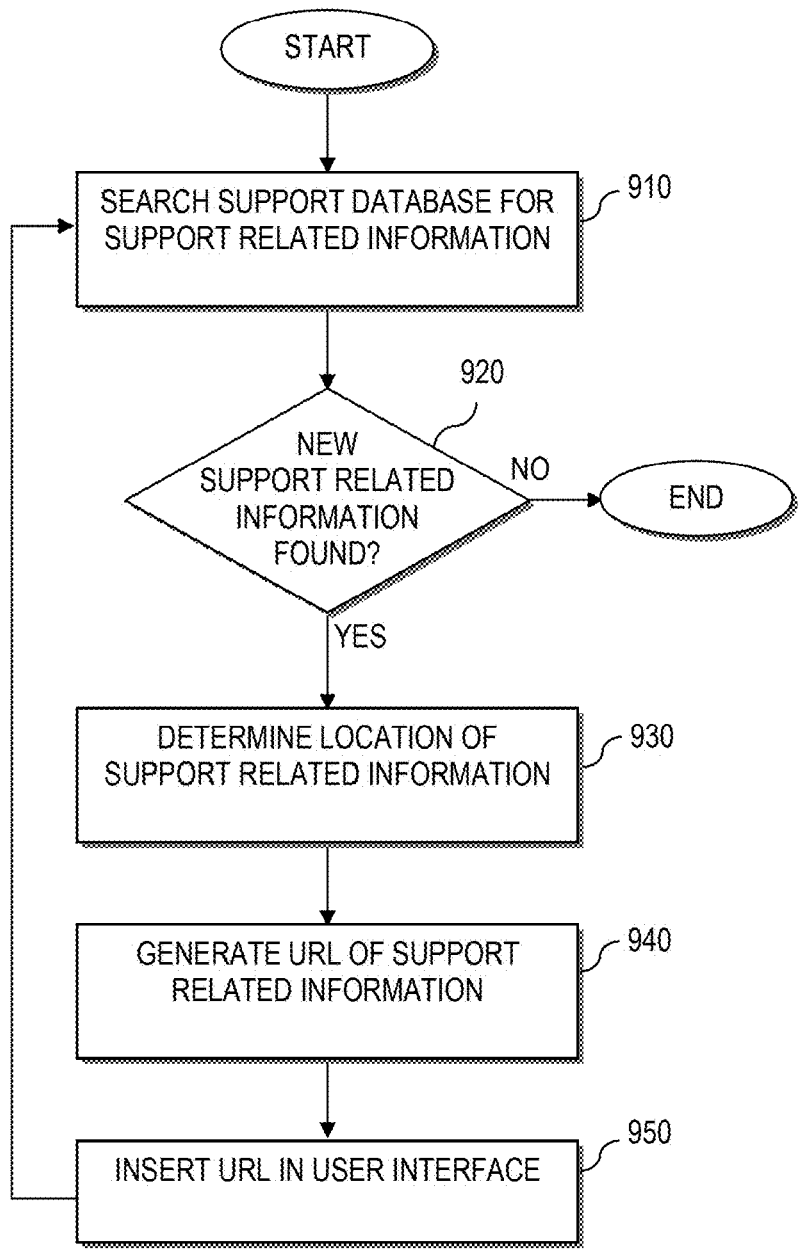
FIG. 9 is a flowchart showing an embodiment of a process for managing support information in a mainframe system.

Referring to FIG. 9, a flowchart illustrates an embodiment of a process for managing support information in a mainframe system. The illustrative process begins by searching 910 a support database, such as a CSO 340, and determining 920 whether new support related information is found in that support database. If no new support related information is found, then the process ends. However, if new support related information is found, then the process determines 930 a location where the support related information is found. Using that location, the process generates 940 a Universal Resource Locator (URL) for the support related information, and inserts 950 the URL into a user interface.

Figure 10:
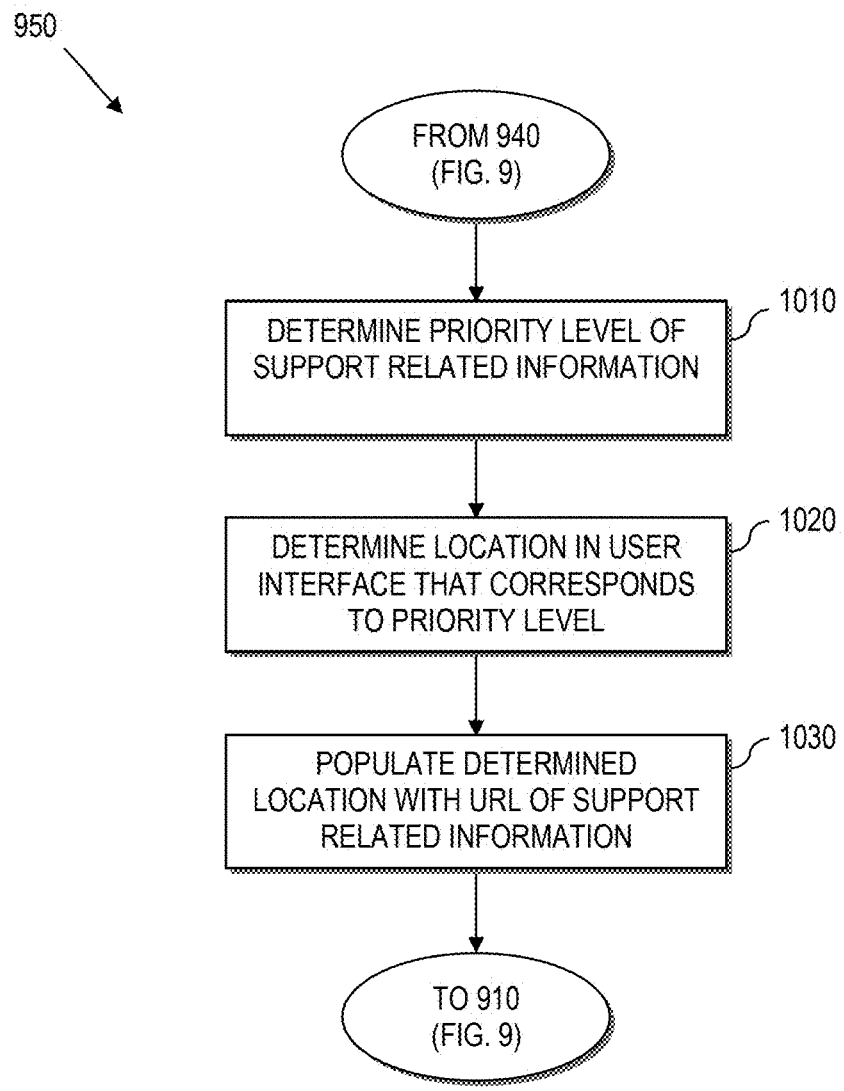
FIG. 10 is a flowchart showing another embodiment of a process for managing support information in a mainframe system.

Referring to FIG. 10, a flowchart illustrates, in greater detail, an embodiment of a process for inserting the URL into the user interface (e.g., see 950 in FIG. 9). The process determines 1010 a priority level of support related information. For example, the priority level can be noted as critical (which would relate to HIPER, PEA, and other items that have a high impact on a mainframe system), time-sensitive (which would relate to social media feeds, calendared events (e.g., meetings, conventions, social media events, etc.), reference materials (e.g., documentation, books, online links, etc.), or any other desired category. Upon determining 1010 the priority level, the process determines 1020 the appropriate location within the user interface that corresponds to the priority level, and populates 1030 that location with the URL of the support related information. Thus, for example, if a particular piece of information is determined 1010 to be critical to the mainframe system, then the URL to that information will be placed in the location that is designated for critical system-related information, and so on. As one can see, by organizing the information in this manner, the system programmer can easily tend to more-critical system-related issues before tending to less-critical system-related issues.

Figure 11:
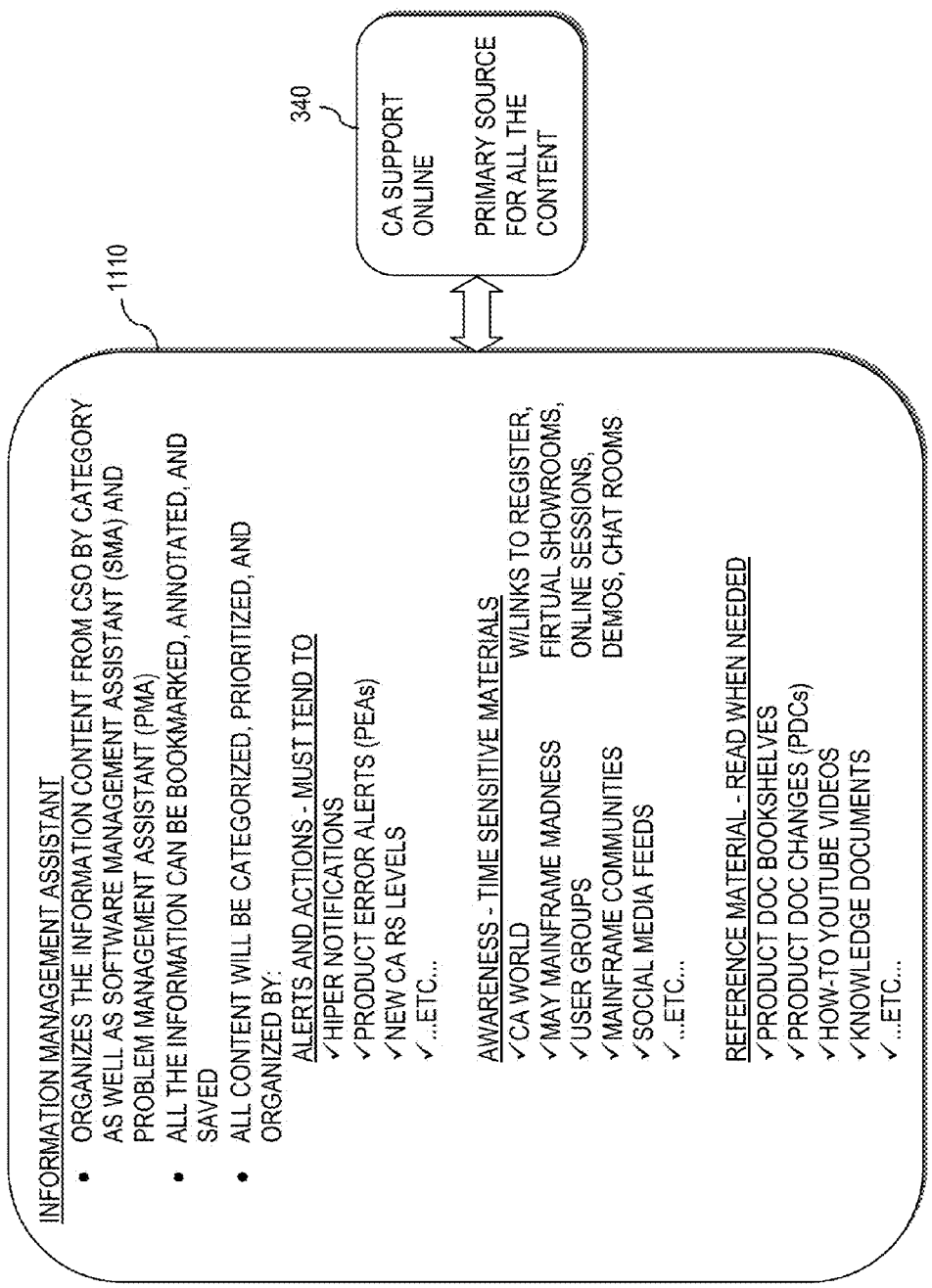
FIG. 11 is a diagram showing various system components that are associated with an embodiment of management software, referred to herein as an Information Management Assistant (IMA).

Referring to FIG. 11, various system components are associated with an embodiment of an Information Management Assistant (IMA) 1110. Again, a z/OS environment with CSO 340 is used to more clearly illustrate the IMA 1110. As noted earlier, the CSO 340 is a primary source for information and documentation on all of the software components that reside in the mainframe system. Thus, in the example implementation, the IMA 1110 searches the CSO 340 for all of the information that will be used to populate the IMA 1110 user interface, which is shown in greater detail with reference to FIGS. 12A and 12B. The IMA 1110 organizes the information from the CSO 340 by category and, for some embodiments, also organizes the information in a manner that corresponds to the display on the SMA 310 or the PMA 710. The IMA 1110 also permits bookmarking, annotating, or saving of information, depending on how the system programmer wishes to organize and review the information. Since methods of annotating and bookmarking information are known, only a truncated discussion is provided herein. All of this information is then displayed on a GUI.

Referring to FIGS. 12A and 12B, an example dashboard GUI is illustrated, which may be associated with the IMA 1110 of FIG. 11. Similar to the SMA GUI 400 and the PMA GUI 800, the IMA GUI 1200 comprises an ordered listing 1210, which corresponds to its SMA and PMA counterparts. As shown in the specific embodiment of FIGS. 12A and 12B, all of the information in the IMA GUI 1200 are organized in distinct categories, such as, for example, Alerts and Actions 1220, Awareness and Time Sensitive 1230, and Reference Manuals 1240. Each of these categories, in turn, may have their own sub-categories. For example, the Alerts and Actions 1220 corresponds to the conditions in the SMA GUI 400. Thus, the Alerts and Actions 1220 section includes information on HIPER, PE, PRP, PEA, LMP, Health Check, etc. Within each category or sub-category, the IMA GUI 1200 provides hyperlinks to a relevant URL to the information. Thus, when a system programmer selects a URL, the IMA 1110 (FIG. 11) retrieves the corresponding information for the system programmer.

Conventionally, it is possible to overload the system programmer with information, especially since mainframe systems can experience upwards of tens of thousands of alerts and errors in any given year. Thus, for some embodiments, the IMA 1110 (FIG. 11) also permits a system programmer to enter an experience level (e.g., novice, proficient, expert, etc.). Where a feature such as an experience level selection is provided, searches of the CSO 340 may be customized for information that is tailored to that particular experience level. So, for example, the IMA GUI 1200 of an expert system programmer would probably not include a "Getting Started" reference manual, while the IMA GUI 1200 of a novice system programmer would include such a reference manual.

By providing a central source for viewing and retrieving information, the IMA 1110 (FIG. 11) and its corresponding GUI 1200 allows a system programmer to quickly review what information is available, and retrieve information as the system programmer desires.

Interplay Between SMA, PMA, and IMA

The SMA (FIGS. 1 through 4B), the PMA (FIGS. 5 through 8), and the IMA (FIGS. 9 through 12B) can be implemented in cooperation to provide a more powerful user experience for a system programmer. For example, when the SMA provides a software update or a HIPER PTF, corresponding documentation on the HIPER PTF or update can be populated in the IMA. Thus, the system programmer has both the update and the relevant documentation relating to the update.

Also, when the PMA identifies an error for which there is an appropriate solution, that solution can be downloaded to the SMA for execution by the system programmer, and a corresponding IMA entry can be generated. Thus, by coordinating the entries and actions between the SMA, PMA, and IMA, the system programmer can be provided with a streamlined interface in which to update and maintain the mainframe system that is under the care of the system programmer.

Computer System Architecture

Figure 13:
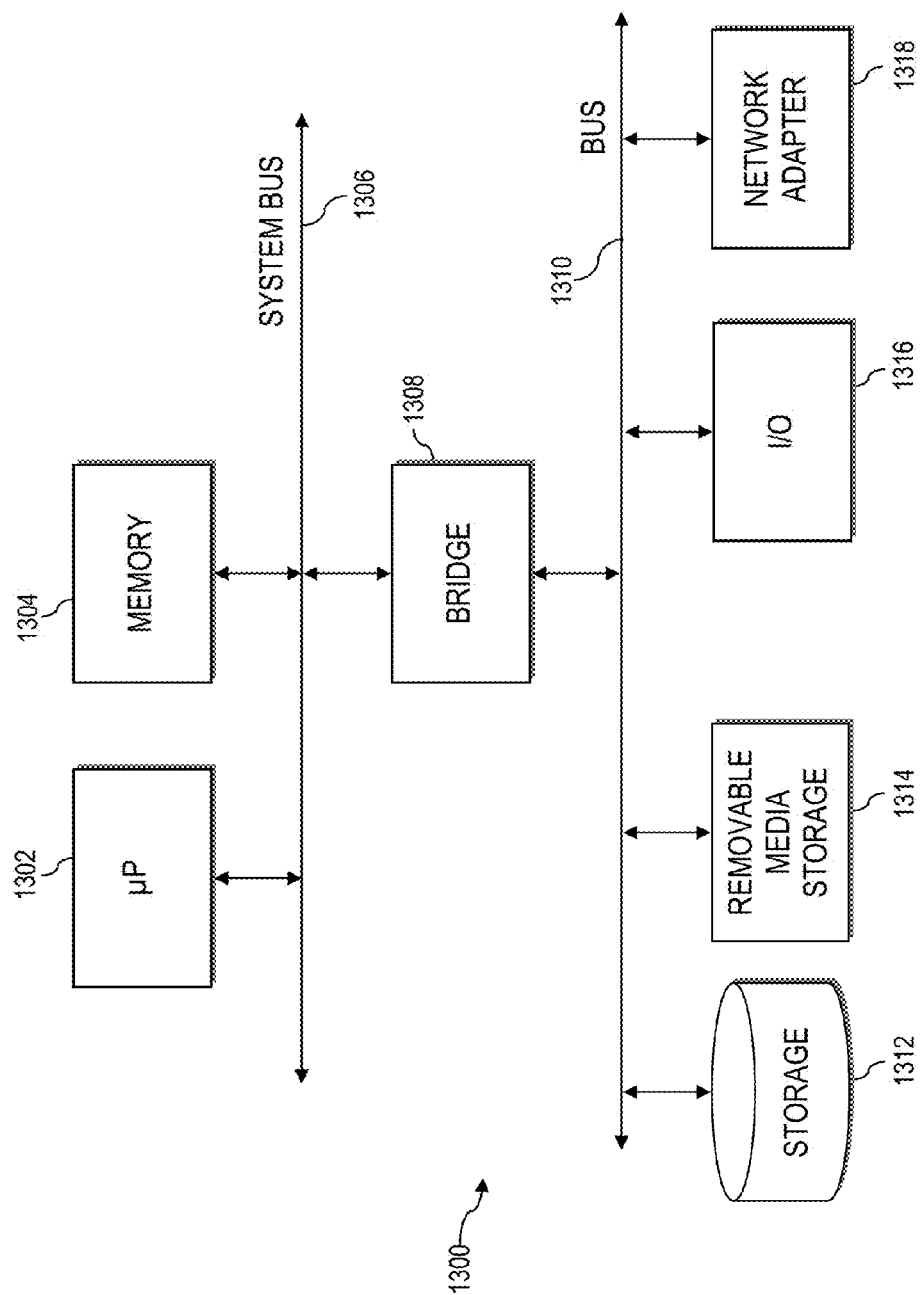
FIG. 13 is a schematic showing one embodiment of a computer system comprising computer readable program code for executing any of the processes described with reference to FIGS. 1 through 12B.

Referring to FIG. 13, a schematic of an example computer system having computer readable program code for executing any aspects described herein with regard to FIGS. 1 through 12B is illustrated. The computer system 1300 includes one or more microprocessors 1302 that are connected to memory 1304 via a system bus 1306. A bridge 1308 connects the system bus 1306 to an input/output (I/O) Bus 1310 that links peripheral devices to the microprocessor(s) 1302. Peripherals may include storage 1312, such as a hard drive, removable media storage 1314, e.g., floppy, flash, CD and/or DVD drive, I/O device(s) 1316 such as a keyboard, mouse, etc. and a network adapter 1318. The memory 1304, storage 1312, removable media insertable into the removable media storage 1314 or combinations thereof, can be used to implement the methods, configurations, interfaces and other aspects set out and described herein with regard to FIGS. 1 through 12B.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated. For example, while various embodiments are disclosed within the context of a z/OS environment, it should be appreciated by those having skill in the art that the disclosed processes, systems, and user interfaces can be modified to accommodate any other mainframe system environment. Also, while particular embodiments are described with reference to CA Technologies® products and services, it should be appreciated that the disclosed embodiments are not limited to CA Technologies® products and services but, instead, can be tailored to accommodate other products and services that are deployed in a mainframe system environment. These, and other such changes, are intended to be within the scope of this disclosure.

What is claimed is:

1. In a mainframe system, a machine-executable process, comprising:
providing a user interface having a plurality of segments, each of the plurality of segments associated with a unique priority level of support related information;
searching a support database for support related information;
determining whether new support related information is found in the support database;
performing, when new support related information is found:
determining a location of the new support related information;
generating a user-selectable Universal Resource Locator (URL) of the determined location; and
inserting the generated URL into the user interface, by:
determining a priority level of the new support related information;
determining a select one of the plurality of segments in the user interface that corresponds to the determined priority level; and
populating the select one of the plurality of segments with the generated URL.

2. The process of claim 1, wherein:
the plurality of segments of the user interface include at least an alert segment, a time-sensitive segment, and a reference segment;
further comprising at least one of:
inserting the generated URL into the alert segment on the user interface;
inserting the generated URL into the time-sensitive information segment on the user interface; and
inserting the generated URL into the reference segment on the user interface.

3. The process of claim 2 further comprising:
subdividing the alert segment into a plurality of sub-segments, including at least a HIPER sub-segment, a Program Temporary FIX sub-segment, a PTF-in-Error sub-segment, a License Managed Program sub-segment, and a system check sub-segment;
wherein inserting the generated URL into the alert segment on the user interface comprises at least one of:
inserting a URL associated with information about a High-Impact PERvasive (HIPER) condition into the HIPER sub-segment;
inserting a URL associated with information about a Program Temporary Fix (PTF) for installation into the Program Temporary FIX sub-segment;
inserting a URL associated with information about a PTF-in-Error (PE) condition into the PTF-in-Error sub-segment;
inserting a URL associated with information about a License Managed Program (LMP) expiration condition into the License Managed Program sub-segment; and
inserting a URL associated with information about a system check condition into the system check sub-segment.

4. The process of claim 2 further comprising:
subdividing the reference segment into a plurality of sub-segments, including at least a meeting sub-segment, an event sub-segment, and a conference sub-segment;
wherein inserting the generated URL into a reference segment on the user interface comprises at least one of:
inserting a URL associated with information about a meeting into the meeting sub-segment;
inserting a URL associated with information about a social media event into the media event sub-segment; and
inserting a URL associated with information about a conference into the conference sub-segment.

5. The process of claim 2 further comprising:
subdividing the time-sensitive information segment into a plurality of sub-segments, including at least a reference document sub-segment, a news-feed sub-segment, and a video tutorial sub-segment;

wherein inserting the generated URL into a time-sensitive information segment on the user interface comprises at least one of:
inserting a URL associated with information about a reference document into the reference document sub-segment;
inserting a URL associated with information about a news feed into the news-feed sub-segment; and
inserting a URL associated with information about a video tutorial into the video tutorial sub-segment.

6. A computer-readable storage medium comprising hardware with executable program code stored thereon, wherein the program code includes instructions that when executed by a mainframe computer system, implement:
a user interface having a plurality of segments, each of the plurality of segments associated with a unique priority level of support related information;
a support database; and
an information management assistant communicatively coupled to the support database, the information management assistant operative to search the support database for new support information, the information management assistant operative to further generate a URL associated with the new support information, the information management assistant to further provide the generated URL in the user interface so as to:
determine a priority level of the new support related information;
determine a select one of the plurality of segments in the user interface that corresponds to the determined priority level; and
populate the select one of the plurality of segments with the generated URL.

7. The computer-readable storage medium of claim 6, wherein:
the plurality of segments of the user interface include at least an alerts and actions segment, a time-sensitive information segment, and a reference segment; and
the location in the user interface that corresponds to the determined priority level is at least one of:
the alerts and actions segment;
the time-sensitive information segment; and
the reference segment.

8. The computer-readable storage medium of claim 6, wherein the generated URL is associated with least one of:
information associated with a High-Impact PERvasive (HIPER) condition;
information associated with a Program Temporary Fix (PTF) for installation;
information associated with a PTF-in-Error (PE) condition;
information associated with a License Managed Program (LMP) expiration condition; and
information associated with a system check condition.

9. The computer-readable storage medium of claim 6, wherein the generated URL is associated with least one of:
information associated with a meeting;
information associated with a social media event; and
information associated with a conference.

10. The computer-readable storage medium of claim 6, wherein the generated URL is associated with least one of:
information associated with a reference document;
information associated with a news feed; and
information associated with a video tutorial.

11. A computer-readable storage medium comprising hardware with executable program code stored thereon to generate a graphical user interface, wherein the program code includes instructions that when executed by a mainframe computer system, implement:
a first segment comprising a first ordered listing of entries, the first ordered listing of entries comprising a first user-selectable entry, the first user-selectable entry comprising a first hyperlink to information associated with a first condition, the first condition having a first risk level that is indicative of an impact of the first condition on a mainframe system, wherein the first risk level is associated with the first segment; and
a second segment that is visually separate from the first segment, the second segment comprising a second ordered listing of entries, the second ordered listing of entries comprising a second user-selectable entry, the second user-selectable entry comprising a second hyperlink to information associated with a second condition, the second condition having a second risk level that is indicative of an impact of the second condition on the mainframe system, the second risk level being less than the first risk level, wherein the second risk level is associated with the second segment.

12. The computer-readable storage medium of claim 11, further comprising a third segment that is visually separate from the first segment, the third segment further being visually separate from the second segment, the third segment comprising a third ordered listing of entries, the third ordered listing of entries comprising a third user-selectable entry, the third user-selectable entry comprising a third hyperlink to information associated with a third condition, the third condition having a third risk level that is indicative of an impact of the third condition on a mainframe system, the third risk level being less than the second risk level, wherein the third risk level is associated with the third segment.

13. The computer-readable storage medium of claim 12, wherein:
the first segment comprising hyperlinks to alerts and actions;
the second segment comprising hyperlinks to time-sensitive information; and
the third segment comprising hyperlinks to reference materials.

14. The computer-readable storage medium of claim 12, wherein the first segment further comprises:
a first alert sub-segment comprising hyperlinks to information about a High-Impact PERvasive (HIPER) condition in a mainframe system;
a second alert sub-segment comprising hyperlinks to information about a Program Temporary Fix (PTF) to be applied in the mainframe system;
a third alert sub-segment comprising hyperlinks to information about a PTF-in-Error (PE) condition in the mainframe system;
a fourth alert sub-segment comprising hyperlinks to information about a License Managed Program (LMP) expiration condition in the mainframe system; and
a fifth alert sub-segment comprising hyperlinks to information about a system check condition.

15. The computer-readable storage medium of claim 12, wherein the second segment further comprises:
a first time-sensitive information sub-segment comprising hyperlinks to information about meetings;
a second time-sensitive information sub-segment comprising hyperlinks to information about social media; and
a third time-sensitive information sub-segment comprising hyperlinks to information about conferences.

16. The computer-readable storage medium of claim 12, wherein the third segment further comprises:
- a first reference sub-segment comprising hyperlinks to reference documents;
- a second reference sub-segment comprising hyperlinks to news feeds; and
- a third reference sub-segment comprising hyperlinks to online video tutorials.

17. The machine-executable process of claim 1, wherein providing a user interface having a plurality of segments further includes providing a dashboard graphical user interface.

18. The machine-executable process of claim 1, further comprising:
- receiving an indication of an experience level of a user; and
- customizing the user interface based on the indication of the experience level of the user.

19. The computer-readable storage medium of claim 6, wherein the program code to implement a user interface further comprises program code to implement a dashboard graphical user interface.

20. The computer-readable storage medium of claim 6, wherein the program code further comprises program code to implement:
- receiving an indication of an experience level of a user; and
- customizing the user interface based on the indication of the experience level of the user.

\* \* \* \* \*